(12) United States Patent  
Berton et al.

(10) Patent No.: US 10,908,298 B2  
(45) Date of Patent: Feb. 2, 2021

(54) TRACKING USING GEOLOCATION

(71) Applicant: GENETEC INC., St-Laurent (CA)

(72) Inventors: Alexandre Berton, Agnetz (FR); Christophe Fauconnet, Paris (FR); Bruno Pires, Ormesson sur Marne (FR); Nicolas Rossignol, Bois Colombes (FR); Frédéric Derouineau, Changis sur Marne (FR); David Lenot, Lamorlaye (FR); Giovanni Taccori, Montrouge (FR)

(73) Assignee: GENETEC INC., St-Laurent (CA)

( * ) Notice: Subject to any disclaimer, the term of this patent is extended or adjusted under 35 U.S.C. 154(b) by 165 days.

(21) Appl. No.: 16/042,560

(22) Filed: Jul. 23, 2018

(65) Prior Publication Data

US 2019/0310380 A1 Oct. 10, 2019

(30) Foreign Application Priority Data

Apr. 10, 2018 (FR) ...................... 18 53124

(51) Int. Cl.
*G01S 19/42* (2010.01)
*G06K 9/00* (2006.01)
*G01S 5/02* (2010.01)
*G01C 21/20* (2006.01)

(52) U.S. Cl.
CPC ............ *G01S 19/426* (2013.01); *G01C 21/20* (2013.01); *G06K 9/00476* (2013.01); *G01S 5/0257* (2013.01)

(58) Field of Classification Search
CPC ...... G01S 19/426; G01S 5/0257; G06F 16/29; G06K 9/00476; G01C 21/32
See application file for complete search history.

(56) References Cited

U.S. PATENT DOCUMENTS

| 2007/0129892 | A1 | 6/2007 | Smartt et al. |
| 2008/0291278 | A1 | 11/2008 | Zhang et al. |
| 2009/0210147 | A1 | 8/2009 | Bauer et al. |
| 2013/0286022 | A1* | 10/2013 | Kubota ................... G01S 7/10 345/440 |

(Continued)

FOREIGN PATENT DOCUMENTS

CN 103575279 A 2/2014

OTHER PUBLICATIONS

FR application 1853124 Search Report dated Dec. 12, 2018.
FR application 1853124 Written Opinion dated Dec. 12, 2018.

*Primary Examiner* — Erin F Heard
*Assistant Examiner* — Donald H B Braswell
(74) *Attorney, Agent, or Firm* — Anglehart et al.

(57) ABSTRACT

Geolocation device target path data is processed by receiving source geolocation path data about a plurality of targets from at least one geolocation device, analyzing the path data to detect when the path data from one of the targets and the path data from another of the targets are likely to represent a same physical target, and generating modified path data to represent only one target using a merger of the path data from one of the targets and the path data from the other of the targets when they are likely to represent the same physical target. Providing merged and/or de-merged target path data improves the ability of a user to monitor geolocation device target path data.

25 Claims, 7 Drawing Sheets

(56) References Cited

U.S. PATENT DOCUMENTS

| | | | |
|---|---|---|---|
| 2016/0018524 A1* | 1/2016 | Zeng | G01S 17/66 356/4.01 |
| 2019/0018130 A1* | 1/2019 | Griggs | G01S 13/66 |
| 2019/0072646 A1* | 3/2019 | Zelen | G01S 7/4004 |
| 2019/0351824 A1* | 11/2019 | Kim | B60W 40/02 |

* cited by examiner

TRACKING USING GEOLOCATION

This application is a U.S. nonprovisional patent application, claims priority from patent application in France No. FR 1853124 filed Apr. 10, 2018, the specification contents of which is hereby incorporated by reference.

TECHNICAL FIELD

This patent application relates to tracking of objects or people (targets) using geolocation data and to processing of geolocation data.

BACKGROUND

Geolocation systems such as GPS receivers, radar detectors, laser location systems, cameras, buried cable intrusion detectors, passive or active motion sensors, etc. are able to provide object or person tracking data for display on maps and other purposes. Geolocation systems or devices typically take readings at frequent intervals and are such systems often output an identifier (ID) and path data concerning a target from the readings. Such geolocation devices are known to fail to read continuously targets, and it happens that a target will fail to be detected by the device, and so the device may detect the movement of one target as the detection of a number of targets over time. This is schematically shown on the left side of FIG. 1 in the appended drawings in which the movement of a target appears as four targets over time.

For the operator using such a system, it is possible to consider the possibility that the different targets detected might be the same target. For an operator having to consider many different sources of information in a security system to determine if what is being presented should be considered a threat or not, the ability to examine path data to accurately and timely consider whether one target or multiple targets have been detected is compromised.

Furthermore, geolocation data related to targets coming from multiple systems will be reported by each system as separate targets. While this target path data can be displayed all together on a common map display, it can be confusing whether there are some targets from different systems that represent the presence of multiple targets (possibly signalling a threat) or merely a single target (possibly signalling no threat).

SUMMARY

Applicant has found that processing of geolocation device target path data to provide merged and/or de-merged target path data improves the ability of a user to monitor geolocation device target path data.

In some embodiments, a method of processing geolocation device target path data comprises receiving source geolocation path data about a plurality of targets from at least one geolocation device, analyzing the path data to detect when the path data from one of the targets and the path data from another of the targets are likely to represent a same physical target, and generating modified path data to represent only one target using a merger of the path data from one of the targets and the path data from the other of the targets when they are likely to represent the same physical target.

In some embodiments, a method of displaying geolocation device target path data comprises receiving source geolocation path data about a plurality of targets from at least one geolocation device, and generating, for display on a display device, display image data representing a geographical area, said display image data containing path indication data corresponding to said source geolocation data for each of said plurality of targets, said path indication data representing said source geolocation path data for said targets as being merged into a common path when the path data of said targets indicates likelihood to represent the same physical target.

It will be appreciated that such a method of displaying geolocation device target path data can be integrated into a user interface of a surveillance system. Accordingly, in some embodiments, there is provided a non-transitory computer readable memory storing instructions that when executed by a processor perform the method of displaying geolocation device target path data comprising receiving source geolocation path data about a plurality of targets from at least one geolocation device, and generating, for display on a display device, display image data representing a geographical area, said display image data containing path indication data corresponding to said source geolocation data for each of said plurality of targets, said path indication data representing said source geolocation path data for said targets as being merged into a common path when the path data of said targets indicates likelihood to represent the same physical target.

The path indication data can comprise a visual coding to indicate when a path has been merged versus when a path is an original source path, for example by color, size, shape or form of dots or lines representing the path, and for example with the portion of the merged path joining two source paths being visually coded. Text labels can alternatively be used to designate merged paths, either as permanent markers or markers that appear when a cursor is placed over the path or merge area. Symbols can also be used to designate merged paths. When paths are merged from heterogenous geolocation devices, it is possible to provide in the visual coding which device provided the path data, particularly when plural devices are active in the same area.

It will also be appreciated that a user interface can allow a user, who disagrees with an automatic merge or simply prefers to monitor a target path with raw data, to select a merged path and to provide input to have the merged path displayed in its original, de-merged, source path data state.

It will also be appreciated that a user interface can allow a user, who believes two source target paths to belong to a same physical target, to select two source target paths and to provide input to have them merged and displayed as merged target paths.

BRIEF DESCRIPTION OF THE DRAWINGS

The invention will be better understood by way of the following detailed description of embodiments of the invention with reference to the appended drawings, in which.

DETAILED DESCRIPTION

The expression "source geolocation path data" as used herein is intended to mean the data produced from a geolocation device about a detected physical target. This data consists fundamentally of simple coordinates, however, in many cases the geolocation devices outputs metadata that links a plurality of detected coordinates into a data set that identifies the path of a target, and as such can be considered to be the "history" of the geolocation data for the target. The source geolocation path data can include an identifier of a target, normally an arbitrary identifier. The geolocation device can, for example, then output either the next location of a target alone with the associated identifier to allow the display system to add the next location to the display of the target path, or it can output the entire history of the target path with the identifier so that the display system can replace the old target path with the latest target path. The expression "path data" as used herein is intended to mean geolocation path data about a target that is either merged from two or more source geolocation path data event, whether from the same geolocation device or from different geolocation devices, de-merged following a merging process or unmodified from the source geolocation path data.

GPS coordinates can be aggregated from various systems such as radars, lasers, cameras, wired intrusion systems, and more globally any system capable of providing georeferenced coordinates, to generate targets on maps.

One of the problems with conventional systems is that each system generates for the same physical target (example a pedestrian, a car, . . . ) a unique identifier and GPS coordinates that are more or less reliable depending on the system. This means in the example of a pedestrian detected at the same time by three different systems that we will have three identifiers and three different GPS coordinates and therefore three targets on the map for the same pedestrian (see the scenario of FIG. 1).

Figure 3:
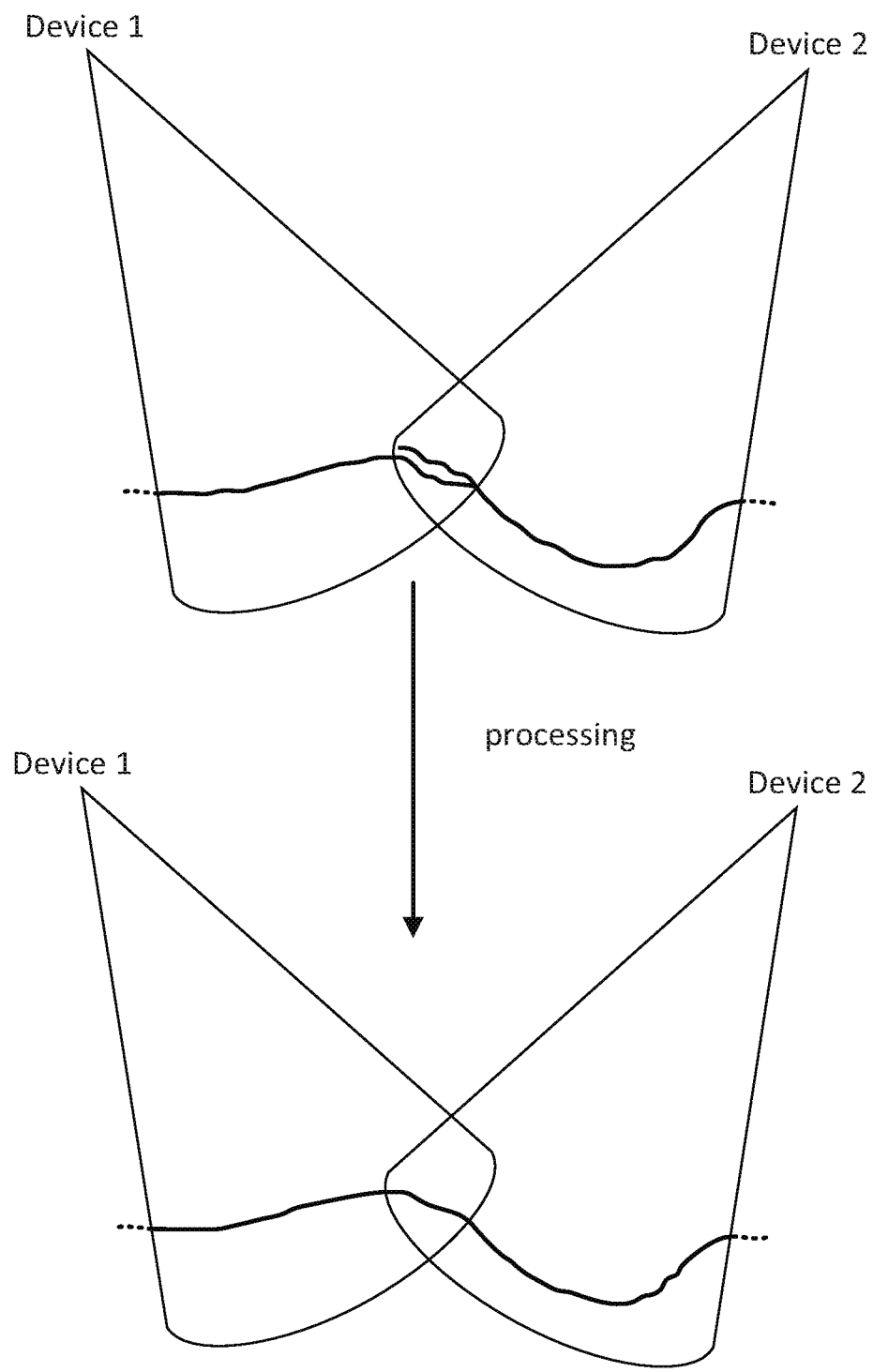
FIG. 3 is a schematic illustration of a coverage map for each of two geolocation devices 1 and 2 prior to applying an embodiment described below on the upper side in which two discrete target paths are displayed and after applying an embodiment described below on the lower side in which a single continuous target path is displayed spanning the coverage maps of the two devices.

The second problem is to be able to follow a target through another system when the first system to detect the target is no longer able to follow (outside its field of monitoring, behind a wall, . . . ) while it is visible in the field of detection/monitoring of another system (see the scenario of FIG. 3).

A further problem is that depending on the reliability of the system the same physical target may be momentarily "lost" and thus generate a new ID. This is expressed visually by a succession of targets instead of representing only one (see the scenario of FIG. 4).

Figure 1:
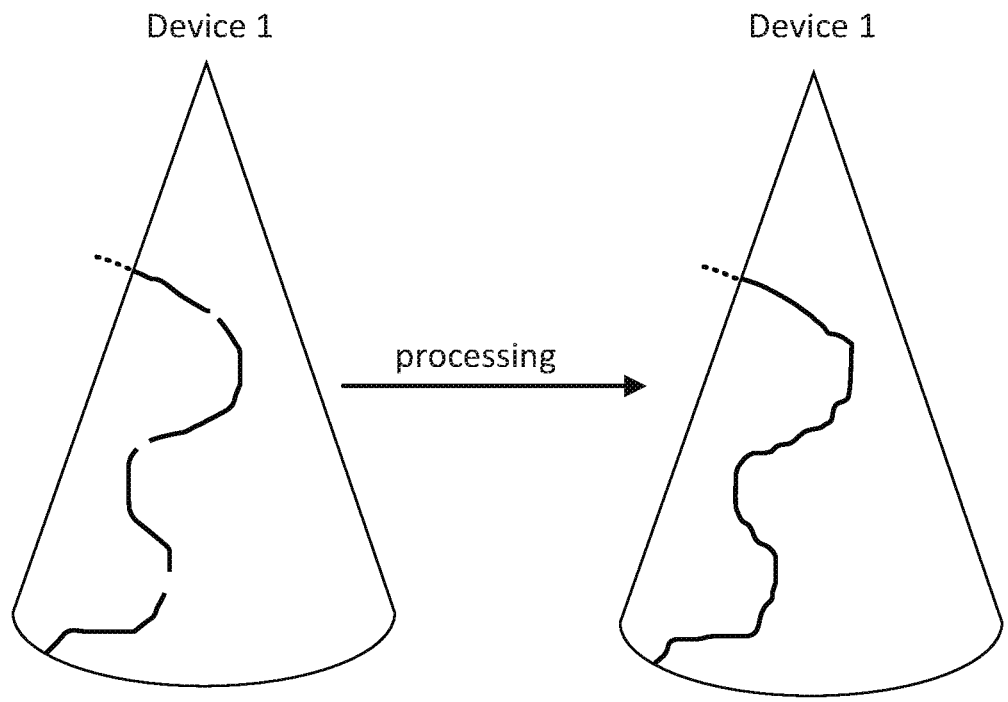
FIG. 1 is a schematic illustration of a coverage map for a geolocation device 1 prior to applying an embodiment described below on the left side in which four discrete target paths are displayed and after applying an embodiment described below on the right side in which a single continuous target path is displayed.

FIG. 1 shows schematically on the left a screen display of the conventional geolocation showing target paths from a single device 1, and on the right a screen display of an embodiment of the invention in which path merging is applied. In the example of FIG. 1, the target's geolocation position data periodic collection was interrupted three times. Each target path can be color coded, labelled or otherwise identified to indicate that it is separate from others or with its target ID. When target paths are merged, this coding or labelling can be the same as the original target path to which further target paths are merged, or an entirely different coding or label can be used to connote that the target path is the result of a merging process.

Figure 2:
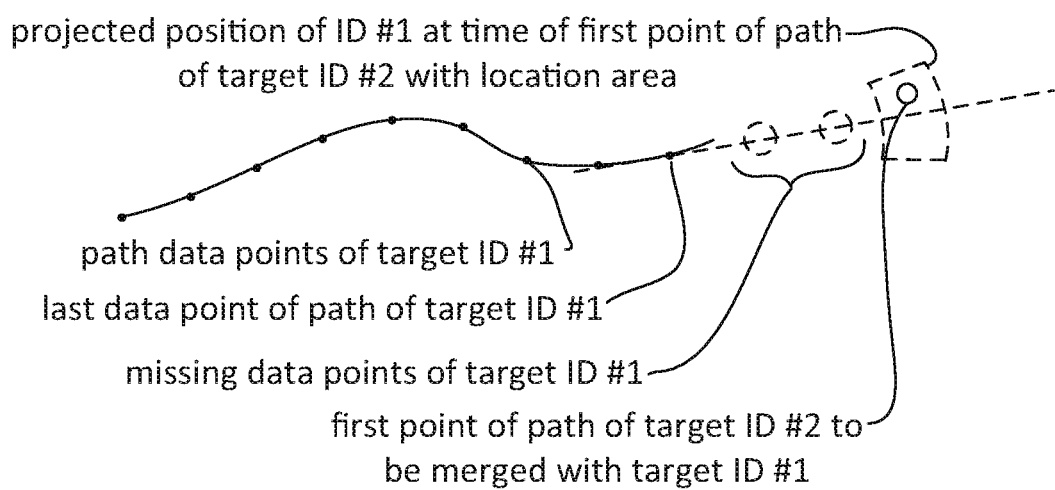
FIG. 2 is a schematic illustration of the target path data points of a target of ID #1 which ends showing the "missing" further data points and a projected location area for target #1 if it had continued in the same direction and speed at the time when a new target is geolocated as target #2.

As schematically illustrated in FIG. 2, the target path data for a target identified as #1 contains location data points that are added to the path data set periodically, and as illustrated can be quite regular depending on the geolocation devices operation. When detection of the target is hampered by physical conditions, detection is interrupted. Device 1 considers the target path of ID #1 to be finished when any further data point in proximity to the last data point fails to be detected within an expected time period.

As will be appreciated, this represents an intelligent algorithm capable of aggregating GPS coordinates from various systems such as radars, lasers, cameras, and more generally of all systems capable of providing georeferenced coordinates in order to merge the targets between the different systems. The goal is to provide the end user with the most streamlined and reliable data source possible.

The algorithm is also able to cancel a merge of target path data if the merge is finally recognized by the algorithm as false. This cancellation is done without loss of data since the totality of the points of each target can be restored.

One target comparison algorithm can be described as follows:

Let C1 be the target 1 already present in the system for which we have from at least two points calculated a direction (Angle) and a speed, and C2 the target 2 of which we receive a new point at a time T.

1) Calculation of the direction (called here D1.2) between the last point of C1 and that of C2 received at time T.

2) Verification that the direction D1.2 is in the average of the direction of the last points of C1.

If the tolerance is exceeded, there is no auto merging possible.

3) Calculation of the accuracy percentage of D1.2 relative to the median of the last points of C1. This percentage is called % angle.

4) As a function of the average velocity of the last points of D1 we determine a velocity VM1 in order to know the possible distance that the target could have traveled between the last point of C1 and that of C2 received at time T. (for example: if C1 was going to 50 km/h and C2 arrives 1.5 s after the last point of C1, it amounts to 50 km/h in 1.5 s or about 20.8 m.

5) Determination of the real distance between the last point of C1 and that of C2.

Verification that the actual distance previously calculated is within the tolerance of the possible distance traveled. The tolerance is a percentage depending on the speed of the target (the faster the target is, the greater the tolerance).

If the tolerance is exceeded, there is no auto merging possible.

6) Calculation of the accuracy percentage between the actual distance between the two points and the calculated possible distance. This percentage is called % distance.

7) If % angle and % distance are high enough, namely within the defined tolerances, auto merging is generated.

8) If a target C2 was merged to a target C1 and steps 2 or 5 are not correct auto-merge is automatically canceled by the algorithm.

It will be appreciated that the more accurate a geolocation device or system is, the smaller the tolerances will be.

As illustrated in FIG. 2, in one embodiment, the speed and direction of target #1 is determined and extrapolated from the last point or points. The extrapolation can be linear or non-linear, and the acceleration or deceleration of the target can also be involved instead of using a simple speed of the target obtained from the last two or several data points. When the first data point of a new target, say #2, from device 1 is detected, in this embodiment, it is determined whether the projection or prediction of the expected location of target #1, within an area of tolerance, matches the new data point of target #2. When it does, target path data from target #2 can be merged into the path data from target #1 and made to appear as the continuation of target #1 on a display of a monitoring system. Optionally, it is possible to wait for a second (or even more) data point from target #2 (not shown in FIG. 2) to confirm that target #2 has the same direction and speed, within tolerances, as target #1 had prior to its interruption before merging the path data from target #2 into the path data of target #1.

The tolerance used can be defined by an operator or configured in the software. Typically, it will be based on the known accuracy of the geolocation device in measuring a target's position. This accuracy can be determined experimentally from the installed system or defined by the manufacturer. The location accuracy will impact on the calculation of both speed and direction of the path that ends because this is based on two or more points from the path data. The tolerance can thus depend on a target's path and/or the rate of location detection and can be variable from one target to another using the same geolocation device. Thus, the prediction of the current position of the target whose path has ended will be an area much larger than that defined by the device's immediate accuracy of position location, and while it can be even a simple circular or polygonal area, it can also be a frustro-conical area as illustrated in FIG. 2. The tolerance data can also be defined by the operator or configured in software to be less than or greater than what is derived from the device's locating accuracy, for example it can be a fixed area surrounding the predicted location.

While in FIG. 1 the geolocation data is obtained from a single device or system, it is also common to combine the information from a number of geolocation devices that have overlapping areas of coverage as illustrated in FIG. 3. In some cases, a first geolocation device can fail to detect targets in areas within its broader coverage area, while a second device can detect the target in such areas. This can happen because of walls or other obstacles. It is thus important to combine the tracking information from various geolocation devices (in some cases using different locating modalities) to provide for effective target tracking.

As illustrated in FIG. 3, the paths of a target passing from left to right detected by each device has an area where the target is detected by both devices. Merging the appearance of the two separate targets into a single geolocated target makes for a significant improvement in monitoring of targets. It is of course important to have confidence that the two targets identified by each device relate to the same target. The merging of path data from one target into the path data from another target can involve ensuring that the direction, speed and optionally the acceleration data correspond within tolerances between the two devices.

Figure 4:
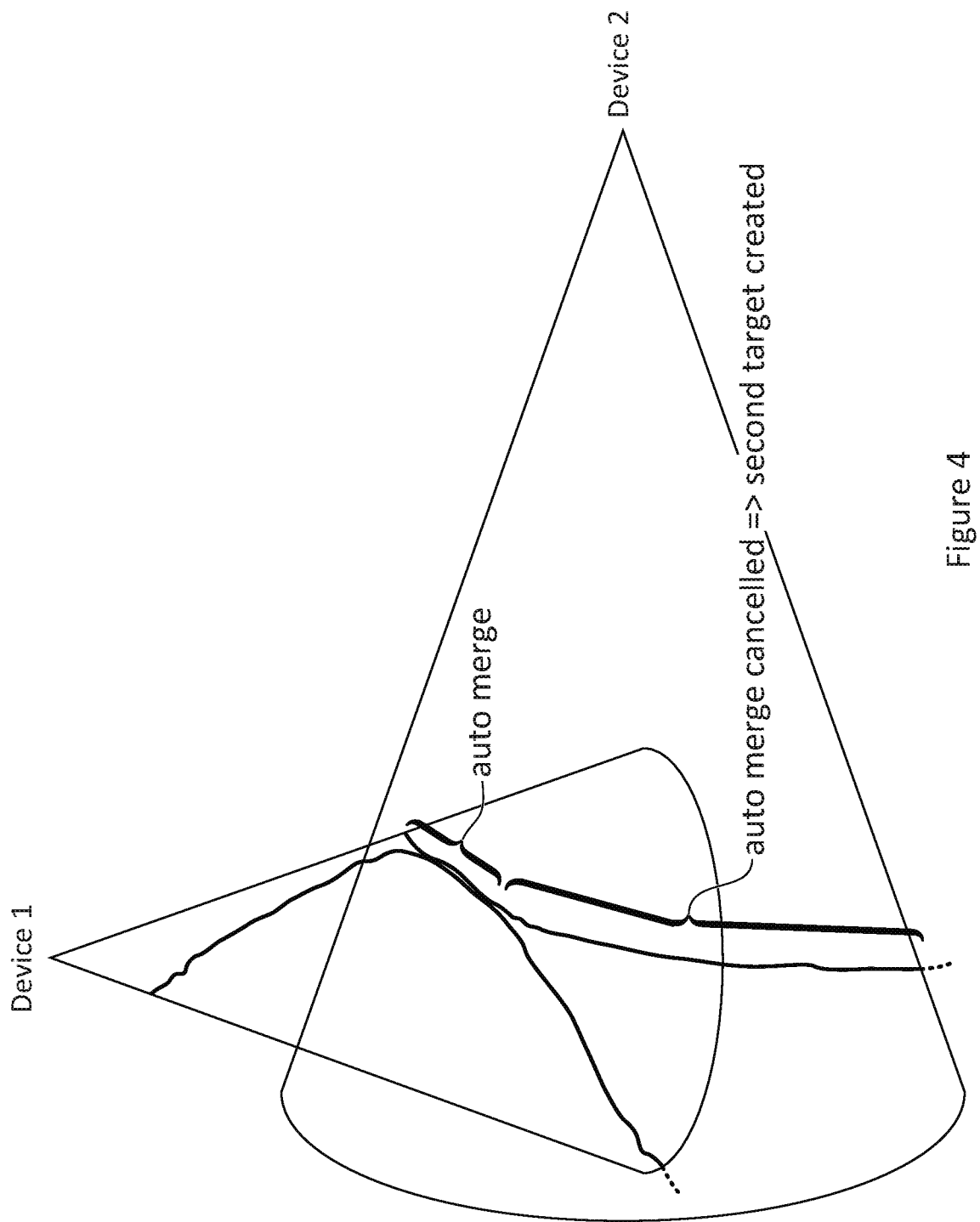
FIG. 4 is a schematic illustration of a coverage map for each of two geolocation devices 1 and 2 according to an embodiment described below in which when two target paths that are originally displayed are considered to be the same path beginning at a first point in time when only a single target path is displayed, and once the two target paths are found to diverge, two target paths are thereafter displayed.

As illustrated in FIG. 4, it is possible for two targets detected by two or more devices to follow a same or similar path over a period of time such that it seems that the two targets are in fact a single target and should be merged. When a target is believed to be detected by two geolocating devices, such as device 1 and device 2, the method of combining or merging the path data from each device to show the user a single target path does not stop monitoring each individual path data set to ensure that any divergence in the target path data from each device is quickly switched to a presentation as two separate target path data sets. In this regard, it is possible during the time that the two target path data sets were merged to show a single path that is either taken from one device, the other device or an average of both devices. However, when it is decided that the merging is to be cancelled or de-merged, the displayed data can return to showing two separate target paths including the separated portions of the nearly overlapping portion of the recent past of the two target paths.

Figure 5:
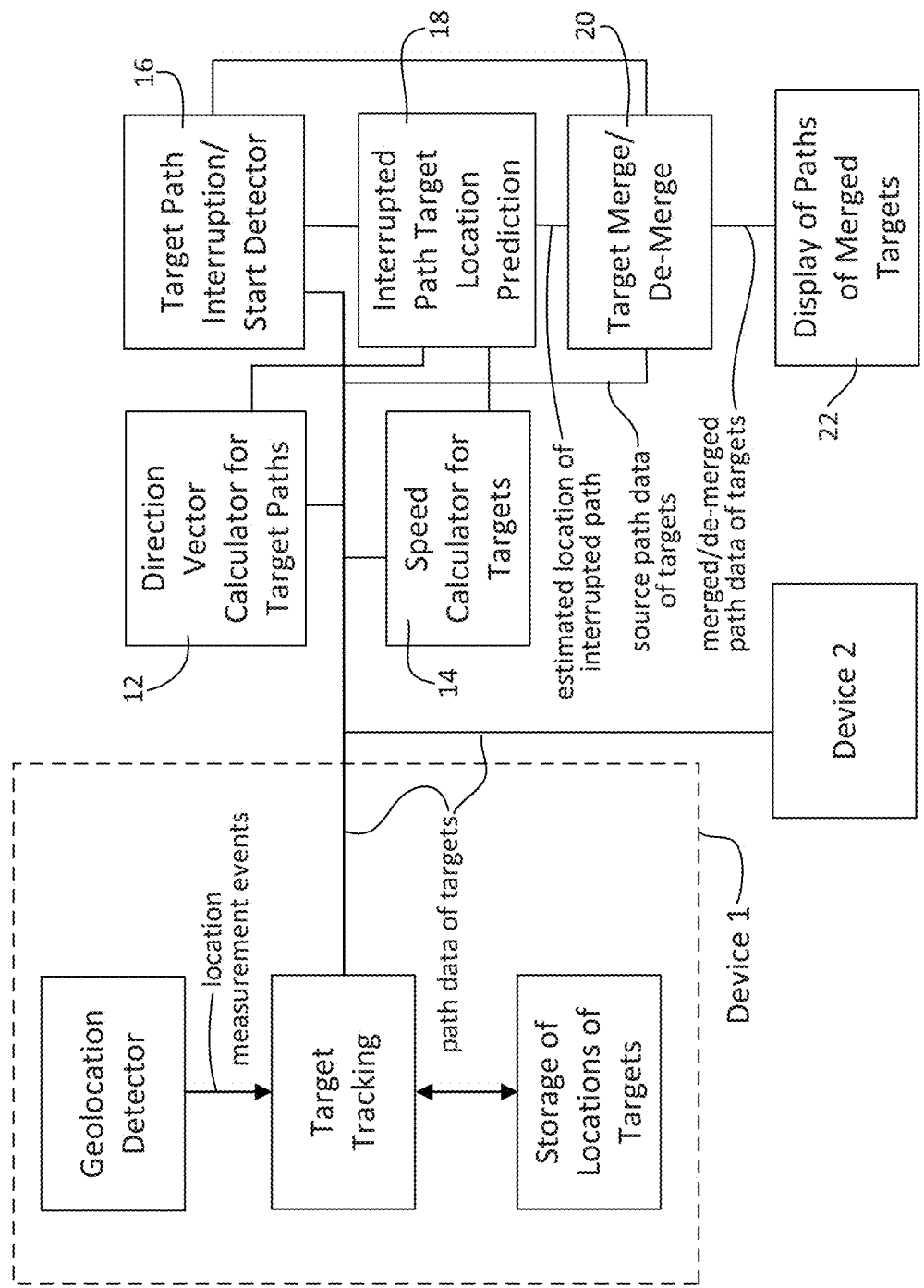
FIG. 5 is a schematic block diagram of a target path data processor according to one embodiment with a display device receiving the merged or de-merged path data.

In FIG. 5, there is shown a schematic block diagram of an apparatus that merges or de-merges source path data of targets. The block can represent software modules of a computer program running on a computer platform having a processor and memory that performs the method of merging or de-merging of source path data of targets for display. Device 1 and device 2 are included in the diagram of FIG. 5 as examples of source path data of targets. It will be appreciated that some embodiments can operate from a single source of geolocation data, while others can combine data from a large number of devices.

As a non-limiting example of geolocating devices, surveillance radar systems such as those from SpotterRF, NavTech, Axis and Rockwell Collins, laser presence detection systems such as those from Optex, buried cable perimeter sensors such as those from Future Fiber Technologies, Intelligent Video Analysis (IVA) camera systems that perform tracking such as the Bosch IVA, and vehicle presence detectors such as those from Optex.

It will be appreciated that some such devices may typically provide a single location reading of a target. Therefore, target path data may comprise a single location and the merging of such data with the data from other devices can provide continuity in the tracking of a target.

Device 1 is illustrated schematically as having a detector that provides location measurement events over time. A target tracking function in the device 1 can determine if an event is close enough in space and time to a previous event so as to determine that it belongs to a recognized target. To aid in this determination, a memory of locations of recognized targets can be provided and used by the target tracking module.

The central function of the apparatus shown in FIG. 5 is the Target Merge/De-Merge module 20. It receives the path data of all targets from all geolocating devices and decides on what merging and demerging of this data should be done before the geolocating data is to be output. As described above, this decision can be done using a variety of criteria, and modules are provided to support the decisions made by module 20.

The direction vector of targets is calculated in module 12. The direction vector can be calculated as a straight line or as a curve based on past points. The speed calculator 14 can calculate a fixed speed or it can include acceleration. Tolerances for the direction and speed can also be calculated for the target path when such tolerances are not fixed.

Module 16 is the target path interruption/start detector and it identifies when the path data for a target is not updated with a new location as the device would normally do, such that the target path ID is terminated. This flagging or labelling of the path data of the targets is useful for module 20, as well as module 18 that performs the prediction of a target location in accordance with an ID that has terminated.

Figures 6, 7:
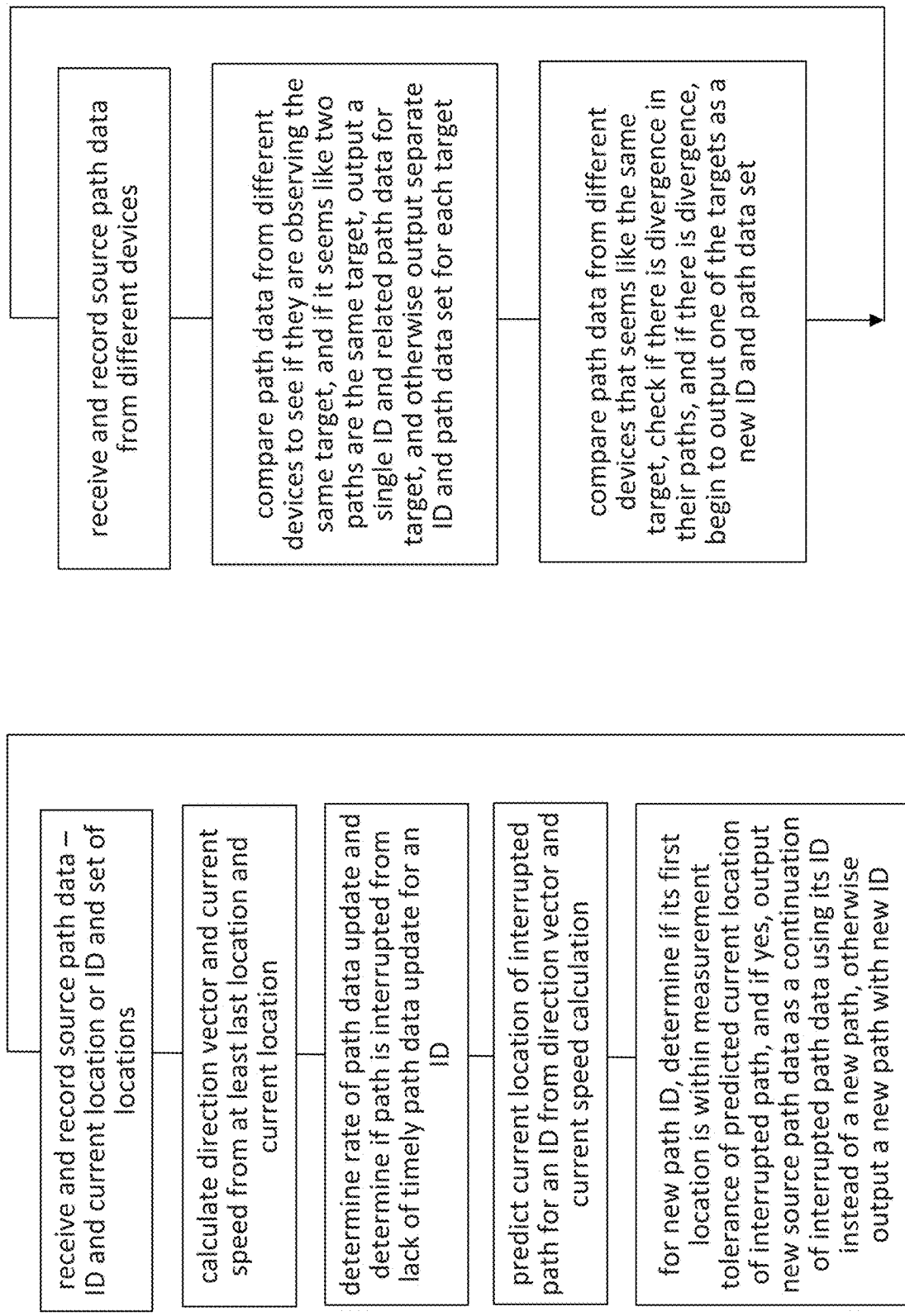
FIG. 6 is a flow diagram of steps involved in merging an interrupted target data path given one ID from a geolocation device and a new data path given another ID from the same geolocation device into a single target data path.
FIG. 7 is a flow diagram of steps involved in merging and de-merging target data paths from different geolocation devices.

Module 20 can then merge the interrupted path of a target detected from a geolocating device with its new path, such that the same target path data is extended and output for display as a map or in any other suitable form. The steps involved in this merging are illustrated in FIG. 6, namely:
receive and record source path data—ID and current location or ID and set of locations;
calculate direction vector and current speed from at least last location and current location;
determine rate of path data update and determine if path is interrupted from lack of timely path data update for an ID;
predict current location of interrupted path for an ID from direction vector and current speed calculation; and
for new path ID, determine if its first location is within measurement tolerance of predicted current location of interrupted path, and if yes, output new source path data as a continuation of interrupted path data using its ID instead of a new path, otherwise output a new path with new ID.

When a user can manually de-merge the displayed target path, it can also be useful to display information concerning the merge conditions. For example, the predicted area, for example in a map display, in which the interrupted target path is expected to be found at the moment when the new target path appeared, similar to what is shown in FIG. 2, can be presented on the display 22. This presentation can optionally be removed at a given time following the merge operation to reduce the amount of information on the display.

As previously mentioned, module 20 also determines when the current location values, direction and speed values for two or more path data sets from different geolocation devices are close enough to believe that they belong to the same target. In that case, the source path data of targets are merged into a single, merged path data set. It will be appreciated that it is possible to consider only location, without considering the direction and speed values for merging path data from different devices.

Should such merged path data sets ever begin to diverge such that the merging of the path data sets should be cancelled, module 20 can return to providing two separate path data sets for the two targets. The steps involved in this merging and de-merging are illustrated in FIG. 7, namely:
receive and record source path data from different devices;
compare path data from different devices to see if they are observing the same target, and if it seems like two paths are the same target, output a single ID and related path data for target, and otherwise output separate ID and path data set for each target; and
compare path data from different devices that seems like the same target, check if there is divergence in their paths, and if there is divergence, begin to output one of the targets as a new ID and path data set.

In the above description, merging and de-merging of the path data of targets is done without specific rules established for the geolocation device type or the location within the area of coverage of a device. It will be appreciated that module 20 can invoke rules for deciding the merging or de-merging of the path data of targets depending on location. An example is when a ground-based radar tracking system is arranged such that it cannot detect objects behind a wall or a building. Such "blind spots" would normally cause the tracking of an object to be interrupted, such that the path data will end when a target enters the blind spot and a new path will start when the target leaves the blind spot.

Figure 8:
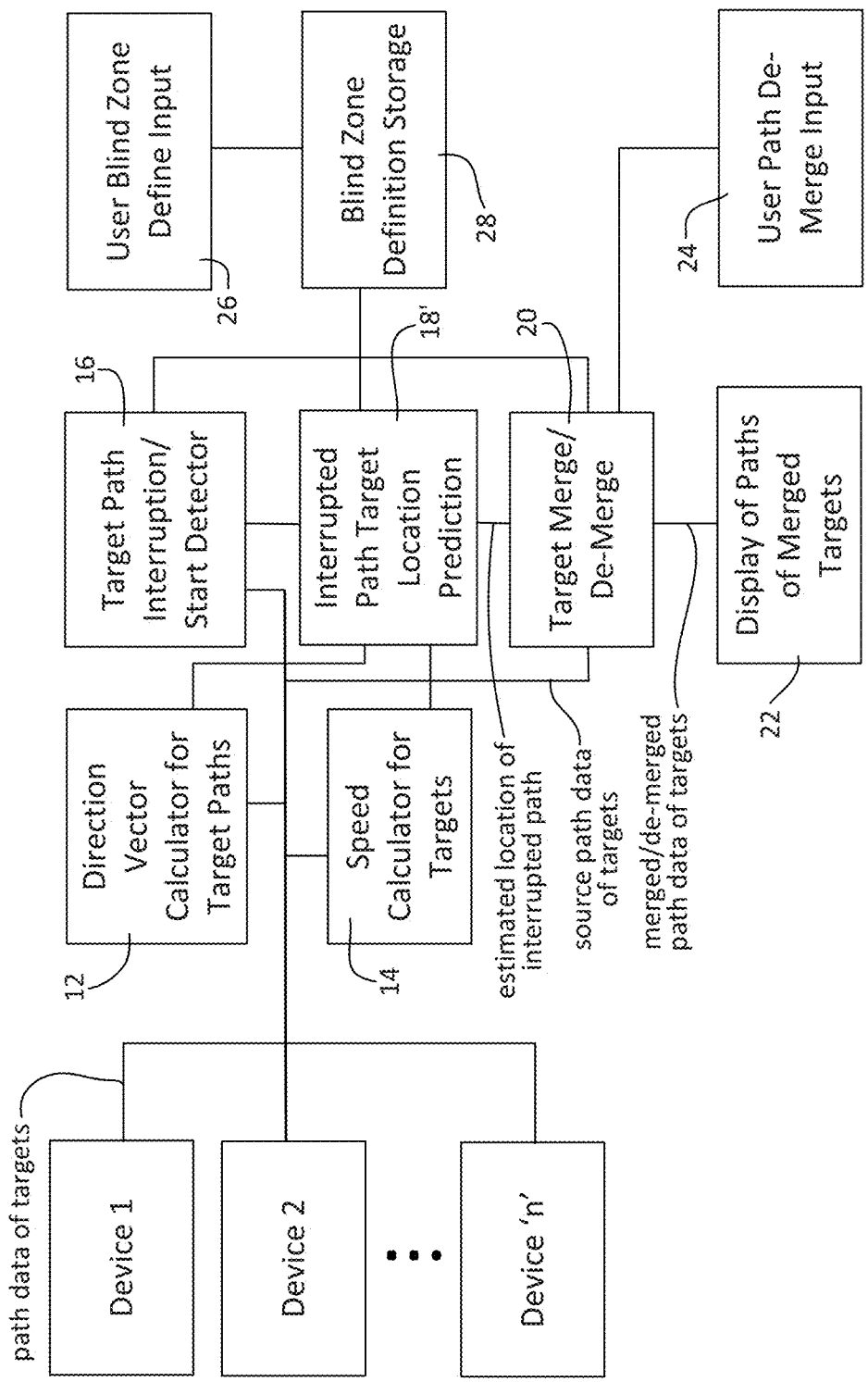
FIG. 8 is a schematic block diagram of a target path data processor according to another embodiment with a display device receiving the merged or de-merged path data and a user interface for defining blind zones and for manual de-merging of merged target paths.

In the embodiment of FIG. 8, the apparatus is shown to include a user interface 24 to allow an operator to select a merged target path and to cause the merged target path to be de-merged should the operator find that the merging (the process of FIG. 7) is not suitable. As described above, the display of target paths can be color coded or otherwise visually indicated on the display as being merged so that the operator can easily perceive whether a target path is the result of merging. It will be appreciated that module 24 can be an independent interface implementing in software or a function within an existing geolocation monitoring interface.

Module 20 can use speed and direction prior to entering the blind spot to determine if a target likely moved into a blind zone. In this case, a user interface 26 to define the areas of blind zones can be provided. Alternatively, it would be possible to analyze historic target path data to determine blind zone areas without user specification. The blind zone area specifications are stored in memory 28 and used by the prediction module 18' that outputs for targets believed to be in a blind zone an estimated location of the target's interrupted path as being within an area surrounding the blind zone. This predicted location is fixed and can remain for any desired predetermined time. This time parameter can be defined by the user with module 26 or again it can be determined from analysis of historical data.

Module 20 then behaves substantially as it did with module 18 when receiving input from module 18', and perform a merge as described above. It will be appreciated that, if a target performs a stop and start action in the blind spot, the merging will still be possible because it is not dependent on continuing at the same speed and direction. It will be appreciated that module 18' thus has a rule that applies to the blind spot that predicts a location at any possible extremity of the blind spot for a target that moved into the blind spot. The interface 26 can specify details of any suitable rules. Thus, any new target appearing at an extremity of the blind spot can be considered by module 20 as an extension of the path data set of the target that moved into the blind spot.

As will be appreciated, the prediction module 18' can be configured with the knowledge of the blind spot areas associated with the various geolocation devices. Such device specific configuration can be performed using an administrator or operator interface 26. Module 18' can also operate with the motion-based prediction abilities of module 18 when a target is not in a blind zone.

Figure 9:
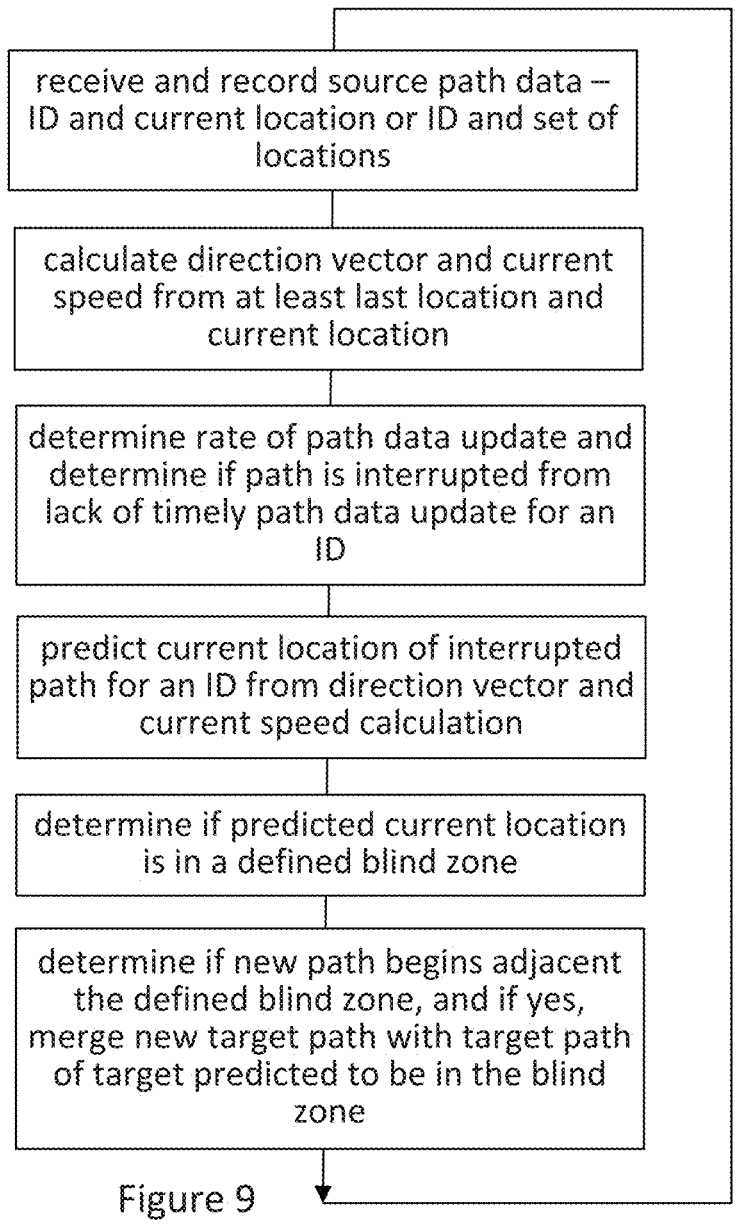
FIG. 9 is a flow diagram of steps involved in merging an interrupted target data path given one ID from a geolocation device and a new data path given another ID from the same geolocation device into a single target data path.

The steps involved in this merging and de-merging are illustrated in FIG. 9, namely:

receive and record source path data—ID and current location or ID and set of locations;

calculate direction vector and current speed from at least last location and current location;

determine rate of path data update and determine if path is interrupted from lack of timely path data update for an ID;

predict current location of interrupted path for an ID from direction vector and current speed calculation;

determine if predicted current location is in a defined blind zone; and determine if new path begins adjacent the defined blind zone, and if yes, merge new target path with target path of target predicted to be in the blind zone.

When a user can manually de-merge the displayed target path, it can also be useful to display information concerning the merge conditions. The blind zone perimeter area, for example in a map display, in which the interrupted target path is expected to be found, at the moment when the new target path appeared, can be presented on the display 22. This presentation can include an indication of the length of time the target was in the blind zone and optionally it can be removed at a given time following the merge operation to reduce the amount of information on the display. Such information can be useful to guide the operator in deciding whether to reject the given automatic merge operation that was done.

The invention claimed is:

1. A computer-implemented method for processing target path data from one or more geolocation devices, the method comprising:

obtaining source geolocation path data about a plurality of targets from at least one geolocation device;

analyzing said source geolocation path data to detect when said source geolocation path data from one of said targets and said source geolocation path data from another of said targets source geolocation are likely to represent a same physical target;

generating modified path data to represent only one target using a merger of said source geolocation path data from said one of said targets and said source geolocation path data from said other of said targets when they are likely to represent the same physical target;

determining when said path data from said one of said targets and said path data from said other of said targets no longer follow within tolerances of each other so as to be considered to be likely to represent a different physical target; and outputting modified path data to represent separate target path data for said one of said targets and said other of said targets.

2. The method of claim 1, wherein said analyzing further comprises:

determining when said path data from said one of said targets ends;

determining a direction and speed of said one of said targets at an end of its path from said path data from said one of said targets;

determining a point in time when said path data from said other of said targets begins;

predicting a location of said one of said targets from said speed and said direction at said point in time; and determining that said path data from one of said targets and said path data from another of said targets are likely to represent a same physical target when said predicted location is close to a location of said other of said targets when said path data from said other of said targets begins.

3. The method of claim 2, wherein said predicting comprises calculating tolerances associated with said at least one geolocation device for said location, and said determining comprises using said location characterized by said tolerances.

4. The method of claim 2, wherein said determining comprises using said location characterized by predetermined tolerances associated with said at least one geolocation device.

5. The method of claim 1, wherein said analyzing comprises:

collecting a definition of one or more blind zones for said at least one geolocation device;

determining, when said path data from said one of said targets ends, whether it is likely that said one of said targets has entered into a given one of said one or more blind zones;

determining, when said path data from said other of said targets begins, whether an initial location of said other target is near a perimeter of said given blind zone; and determining that said path data from one of said targets and said path data from another of said targets are likely to represent a same physical target when said initial location of said other target is near a perimeter of said given blind zone.

6. The method of claim 5, wherein said collecting comprises collecting user input for creating said definition of an area or perimeter for said one or more blind zones and storing said definition in memory.

7. The method of claim 1, wherein receiving geolocation path data comprising receiving said geolocation path data from at least two geolocation devices, and said analyzing comprises determining when said path data from one of said targets from a first one of said geolocation devices and said path data from another of said targets from a second one of said geolocation devices follow within tolerances of each other so as to be considered to be likely to represent a same physical target.

8. A computer-implemented method for processing target path data from geolocation devices for display on a display device, the method comprising processing target path data from geolocation devices according to claim 1, and displaying said modified path data on said display device.

9. The method of claim 8, wherein said displaying comprises providing an identification associated with display of target path data that said target path data represents merged path data or non-merged path data.

10. The method of claim 8, wherein said displaying comprises marking on a graphical map a location of said one or more blind zones.

11. The method of claim 8, further comprising predicting a location of said one of said targets from said speed and said direction at said point in time, wherein said displaying comprises marking on a graphical map an area corresponding to said predicted location and tolerances associated with said at least one geolocation device for said location.

12. A non-transitory computer-readable memory storing computer instructions for causing a computer to perform the method according to claim 1.

13. The method of claim 1, wherein said at least one geolocation device comprises at least one intelligent video analysis (IVA) camera system.

14. The method of claim 2, wherein said at least one geolocation device comprises at least one intelligent video analysis (IVA) camera system.

15. A computer-implemented method for processing target path data from one or more geolocation devices, the method comprising:
receiving source geolocation path data about a plurality of targets from at least one peolocation device;
analyzing said source geolocation path data to detect when said source geolocation path data from one of said targets and said source geolocation path data from another of said targets source geolocation are likely to represent a same physical target;
generating modified path data to represent only one target using a merger of said source peolocation path data from said one of said targets and said source geolocation path data from said other of said targets when they are likely to represent the same physical target; and
accepting user input to cancel said generating modified path data to represent only one target using a merger of said path data from said one of said targets and said path data from said other of said targets and to return to outputting modified path data to represent separate target path data for said one of said targets and said path data from said other of said targets.

16. A non-transitory computer-readable memory storing computer instructions for causing a computer to perform the method according to claim 15.

17. An apparatus for processing target path data from geolocation devices, the apparatus comprising:
a direction vector configured to obtain source geolocation path data about a plurality of targets from at least one geolocation device and providing a direction vector for said path data for each of said plurality of targets;
a speed calculator configured to receive said source geolocation path data and providing a speed value for said path data for each of said plurality of targets;
a target path merge analyzer configured to receive said direction vector, said speed value and said source geolocation path data and providing modified geolocation path data, wherein said modified geolocation path data represents only one target using a merger of said path data from said one of said targets and said path data from said other of said targets when they are likely to represent the same physical target, and further configured to perform one or more of:
determine when said path data from said one of said targets and said path data from said other of said targets no longer follow within tolerances of each other so as to be considered to be likely to represent a different physical target, and output modified path data to represent separate target path data for said one of said targets and said other of said targets; and
accept user input to cancel said modified geolocation path data to represent only one target and to output said modified geolocation path data to represent separate target path data for said one of said targets and said geolocation path data from said other of said targets.

18. The apparatus of claim 17, further comprising a target path interruption/start detector receiving said source geolocation path data and providing a signal representing target path end or start to said merge analyzer.

19. The apparatus of claim 17, further comprising a target path prediction module receiving said source geolocation path data and providing to said merge analyzer a predicted location of one of said targets from said speed value and said direction vector at a point in time.

20. The apparatus of claim 19, wherein said target path prediction module receives a definition of one or more blind zones for one of said at least one geolocation device and provides to said merge analyzer a predicted location of said one of said targets as being near a perimeter of one of said blind zones when said direction vector and said speed value suggests that a target path entered said one of said blind zones.

21. The apparatus of claim 20, further comprising a user interface configured to collect a user selection of said one or more blind zones.

22. The apparatus of claim 17, further comprising a display device receiving said modified geolocation path data and providing a display thereof for a user.

23. The apparatus of claim 17, further comprising a user interface configured to collect a user selection of a given target path, wherein said merge analyzer receives said user selection of said given target path and processes said modified geolocation path data to represent separate targets for said given target path when said given target path is a merger.

24. The apparatus of claim 17, comprising a processor and non-transitory readable memory storing instructions that when processed by said processor cause said apparatus to perform the method of claim 1.

25. The apparatus of claim 17, wherein said at least one geolocation device comprises at least one intelligent video analysis (IVA) camera system.

* * * * *